US010116750B2

(12) United States Patent
Kumar et al.

(10) Patent No.: US 10,116,750 B2
(45) Date of Patent: Oct. 30, 2018

(54) MECHANISM FOR HIGHLY AVAILABLE RACK MANAGEMENT IN RACK SCALE ENVIRONMENT

(71) Applicants: Mohan J. Kumar, Aloha, OR (US); Murugasamy K. Nachimuthu, Beaverton, OR (US)

(72) Inventors: Mohan J. Kumar, Aloha, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 15/089,377

(22) Filed: Apr. 1, 2016

(65) Prior Publication Data
US 2017/0289256 A1 Oct. 5, 2017

(51) Int. Cl.
*G06F 15/16* (2006.01)
*H04L 29/08* (2006.01)
(Continued)

(52) U.S. Cl.
CPC ........ *H04L 67/125* (2013.01); *H04L 12/4641* (2013.01); *H04L 41/12* (2013.01);
(Continued)

(58) Field of Classification Search
None
See application file for complete search history.

(56) References Cited

U.S. PATENT DOCUMENTS 6,335,927 B1 * 1/2002 Elliott ..................... H04L 12/14
370/352
7,003,563 B2 * 2/2006 Leigh .................. H04L 41/0893
709/223
(Continued)

FOREIGN PATENT DOCUMENTS

WO 2004074983 A2 9/2004

OTHER PUBLICATIONS

International Search Report and Written Opinion received for PCT Patent Application No. PCT/US2017/020118, dated May 24, 2017, 9 pages.

*Primary Examiner* — Melvin H Pollack
(74) *Attorney, Agent, or Firm* — Law Office of R. Alan Burnett, P.S.

(57) ABSTRACT

Methods and apparatus for highly available rack management in Rack Scale environment. Rack Management Modules (RMMs) are configured to manage power and thermal zones in a rack including a plurality of pooled system drawers, wherein each pooled system drawer is associated with a respective power zone including power sensors and power control devices and a respective thermal zone including thermal sensors and thermal devices. During operation, one of the RMMs is implemented as a master RMM, and the other is implemented as a slave RMM. The master RMM is used to monitor the power and thermal zones. State information is periodically synchronized between the master RMM and the slave RMM. The RMMs are further configured to perform a fail-over operation in connection with a failed or failing RMM, where after the fail-over operation the slave becomes the new master RMM and the previous master RMM becomes the new slave.

25 Claims, 11 Drawing Sheets

(51) Int. Cl.
   *H04L 12/46* (2006.01)
   *H04L 12/931* (2013.01)
   *H04L 12/24* (2006.01)
   *H04L 29/06* (2006.01)
(52) U.S. Cl.
   CPC .............. *H04L 49/70* (2013.01); *H04L 63/08* (2013.01); *H04L 67/1095* (2013.01)

(56) References Cited

U.S. PATENT DOCUMENTS

| | | | | |
|---|---|---|---|---|
| 7,010,589 | B2* | 3/2006 | Ewing | G06F 1/26 340/693.1 |
| 7,698,405 | B2* | 4/2010 | Brown | H04L 41/00 370/465 |
| 7,774,443 | B2* | 8/2010 | Ewing | G06F 1/26 340/693.1 |
| 7,791,890 | B2* | 9/2010 | Ishida | H05K 7/1492 211/26 |
| 8,200,800 | B2* | 6/2012 | Bolan | G05B 23/0267 709/223 |
| 8,219,839 | B2* | 7/2012 | Akimoto | G06F 1/305 713/300 |
| 8,411,440 | B2* | 4/2013 | Dunwoody | H05K 7/20781 165/104.33 |
| 9,015,224 | B2* | 4/2015 | Nachtrab | H04L 67/125 709/202 |
| 9,037,878 | B2* | 5/2015 | Liu-Shen | G06F 1/189 713/300 |
| 9,104,386 | B2* | 8/2015 | Xu | G06F 1/183 |
| 9,201,933 | B2* | 12/2015 | Phipps | G06Q 10/0637 |
| 9,703,342 | B2* | 7/2017 | Nicholson | G06F 1/266 |
| 9,798,632 | B2* | 10/2017 | Allu | G06F 11/1658 |
| 9,839,005 | B2* | 12/2017 | Catovic | H04W 36/30 |
| 2005/0076255 | A1 | 4/2005 | Bresniker et al. | |
| 2007/0089446 | A1 | 4/2007 | Larson et al. | |
| 2013/0083664 | A1* | 4/2013 | Harris | H04W 24/00 370/241 |
| 2013/0135811 | A1* | 5/2013 | Dunwoody | G06F 1/189 361/679.31 |
| 2013/0190941 | A1 | 7/2013 | Cader et al. | |
| 2013/0322012 | A1* | 12/2013 | Dunwoody | G06F 1/20 361/679.53 |
| 2014/0277819 | A1 | 9/2014 | Mick et al. | |
| 2015/0081878 | A1* | 3/2015 | Pabba | H04L 41/0806 709/224 |
| 2016/0072723 | A1* | 3/2016 | Shanmuganathan | H04L 47/76 709/226 |
| 2017/0054603 | A1* | 2/2017 | Kulkarni | H04L 41/0893 |
| 2017/0208149 | A1* | 7/2017 | Crasta | G06F 12/0813 |
| 2017/0249188 | A1* | 8/2017 | Saladi | G06F 9/505 |

* cited by examiner

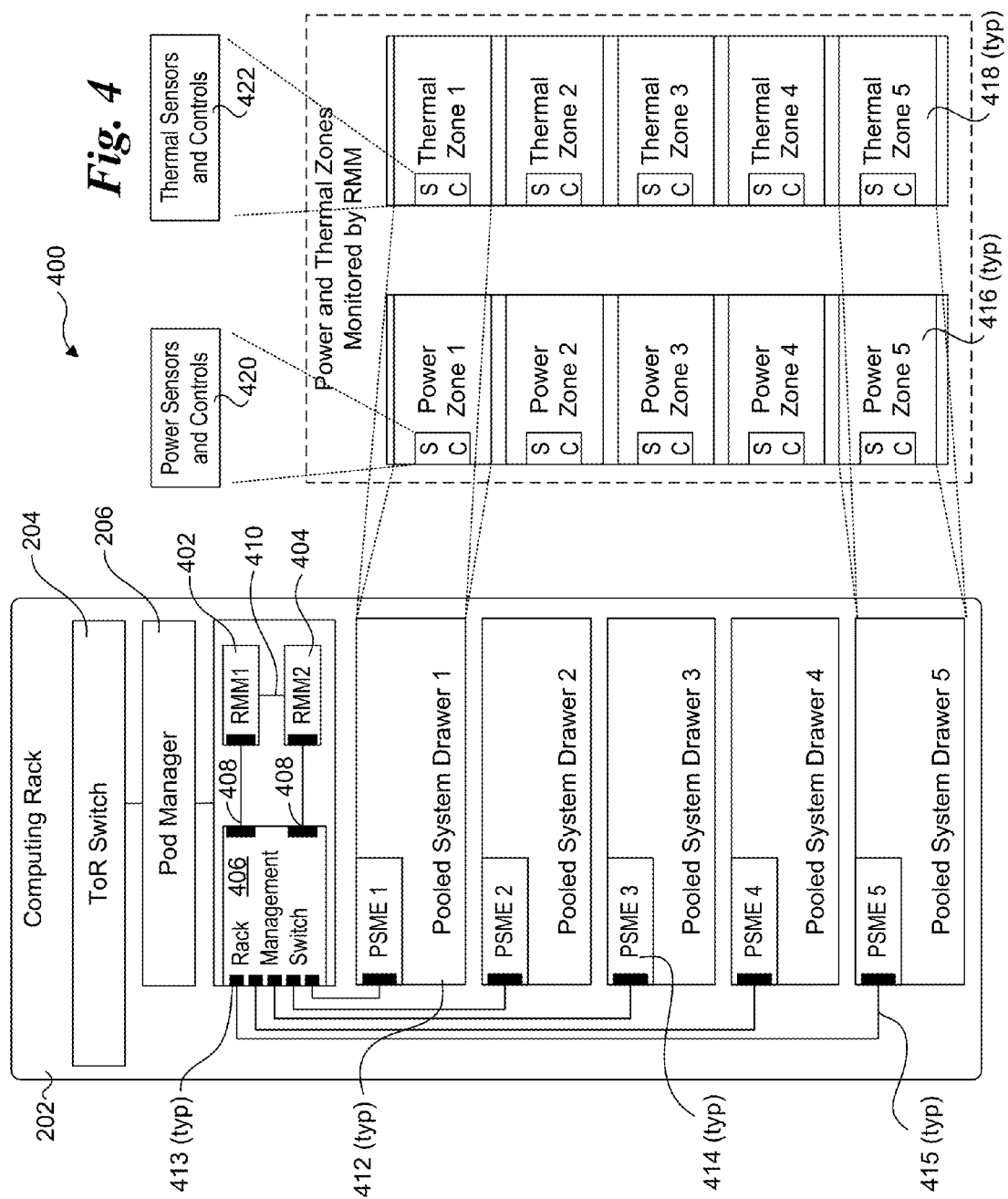

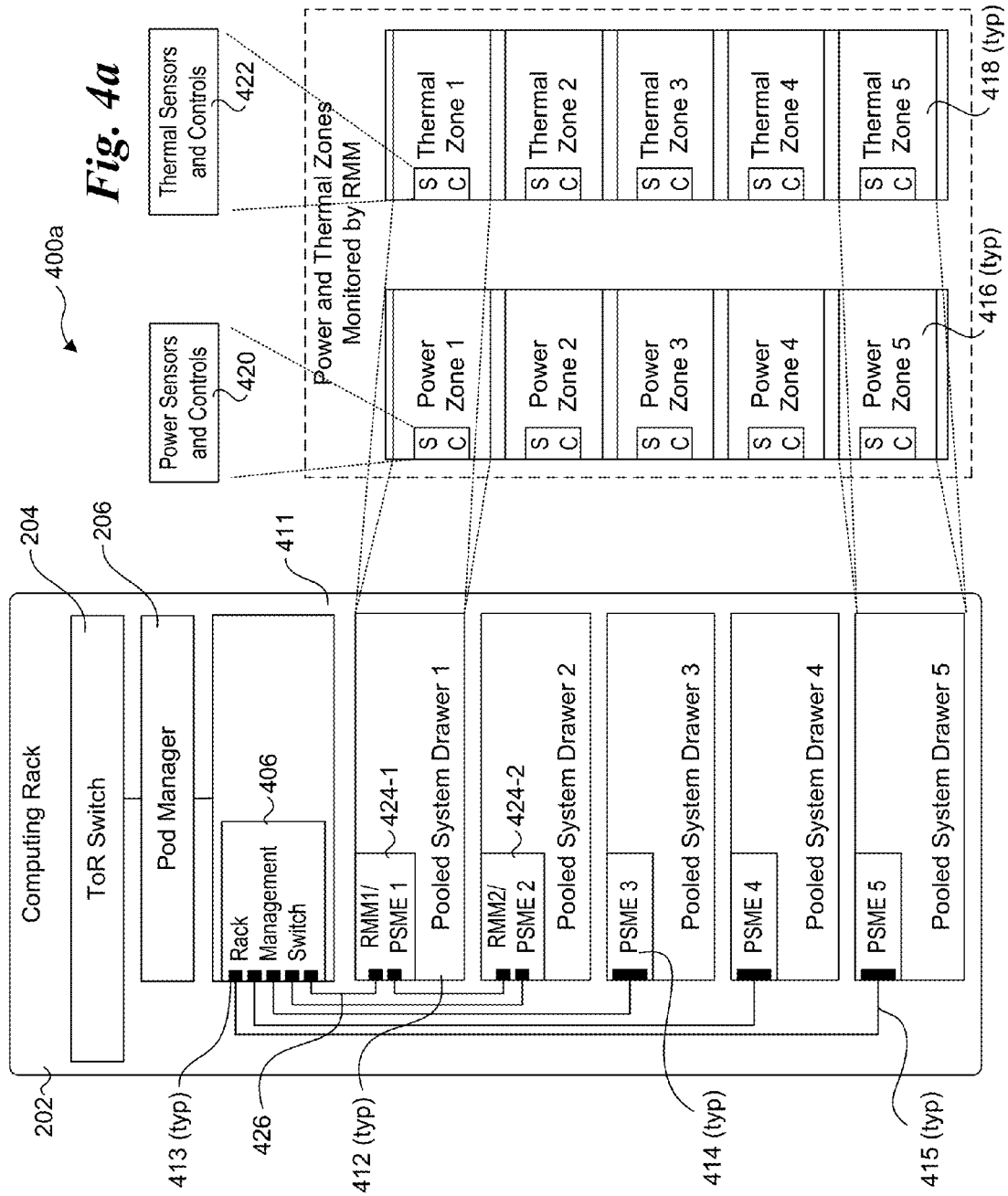

MECHANISM FOR HIGHLY AVAILABLE RACK MANAGEMENT IN RACK SCALE ENVIRONMENT

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," where are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and storage shared resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categories into as Software as a Service (SaaS), Platform as a Service (PaaS), and Infrastructure as a Service (IaaS). SaaS services, also commonly called Web services and cloud application services, enables access to services running on datacenter servers via a network connection and client-side interface, such as a Web browser. Well-known examples of SaaS services include e-mail Web services (e.g., Google gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchases IaaS based on consumption. For example, AWS and Windows Azure respectively offer use of Amazon and Microsoft datacenter resources on a resource allocation/consumption basis.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 is a schematic diagram showing further details of an RSA rack implementing redundant Rack Management Modules (RMMs) used to manage power and control zones for pooled system drawers, according to one embodiment;

FIG. 4a is a schematic diagram showing an alternative scheme to that shown in FIG. 4 under which the functionality of RMMs and PSMEs are combined, employing redundant RMM/PSMEs;

DETAILED DESCRIPTION

Figure 1:
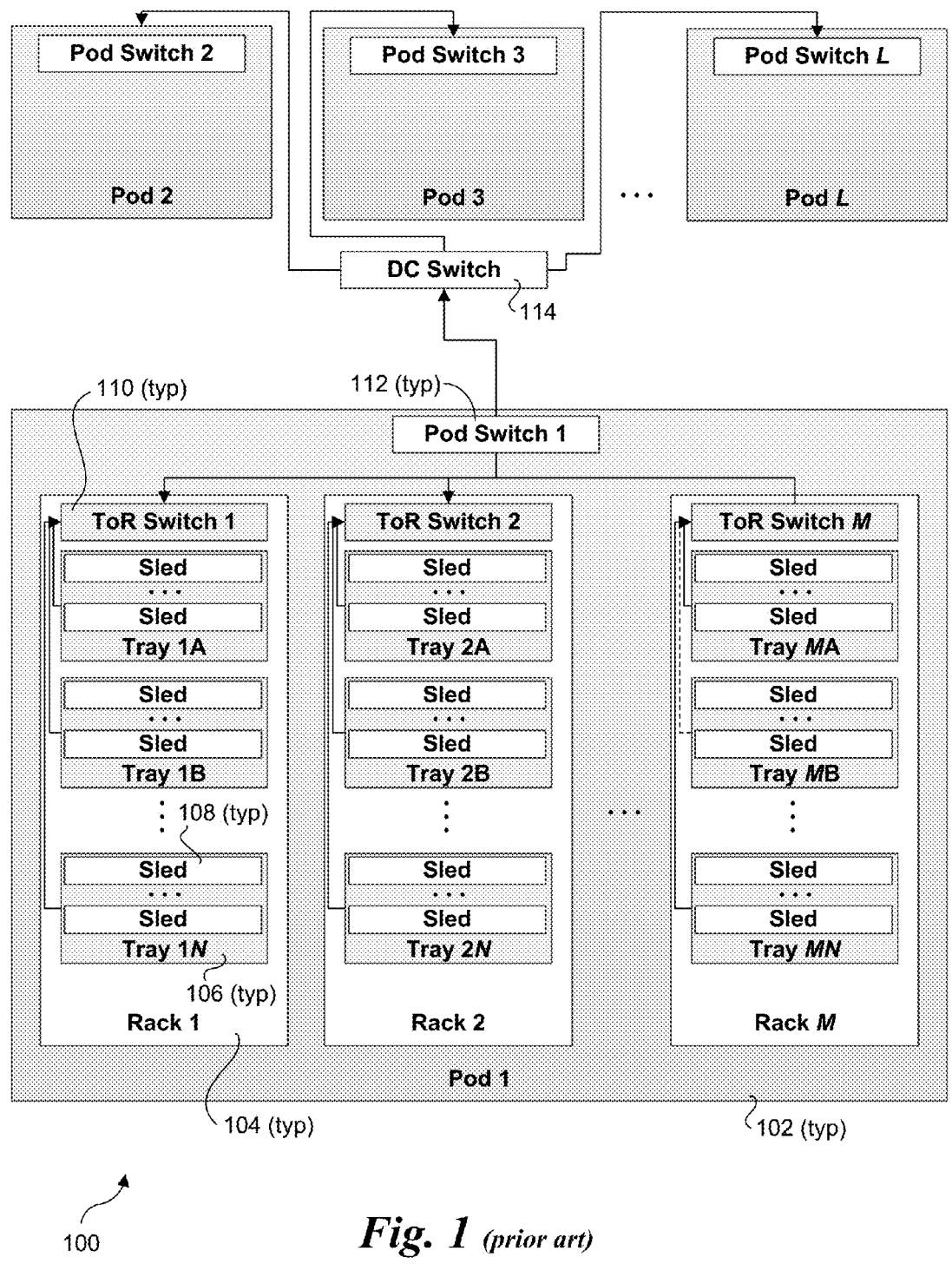
FIG. 1 is a schematic diagram of a conventional physical rack configuration in a data center.

Embodiments of methods and apparatus for highly available rack management in Rack Scale environment are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, Intel® Corporation introduced new rack architecture called Rack Scale Architecture (RSA). Rack Scale Architecture is a logical architecture that disaggregates compute, storage, and network resources and introduces the ability to pool these resources for more efficient utilization of assets. It simplifies resource management and provides the ability to dynamically compose resources based on workload-specific demands.

RSA uses compute, fabric, storage, and management modules that work together to enable selectable configuration a wide range of virtual systems. The design uses four basic pillars, which can be configured based on the user needs. These include 1) a Pod Manager for multi-rack management, comprising firmware and software APIs that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
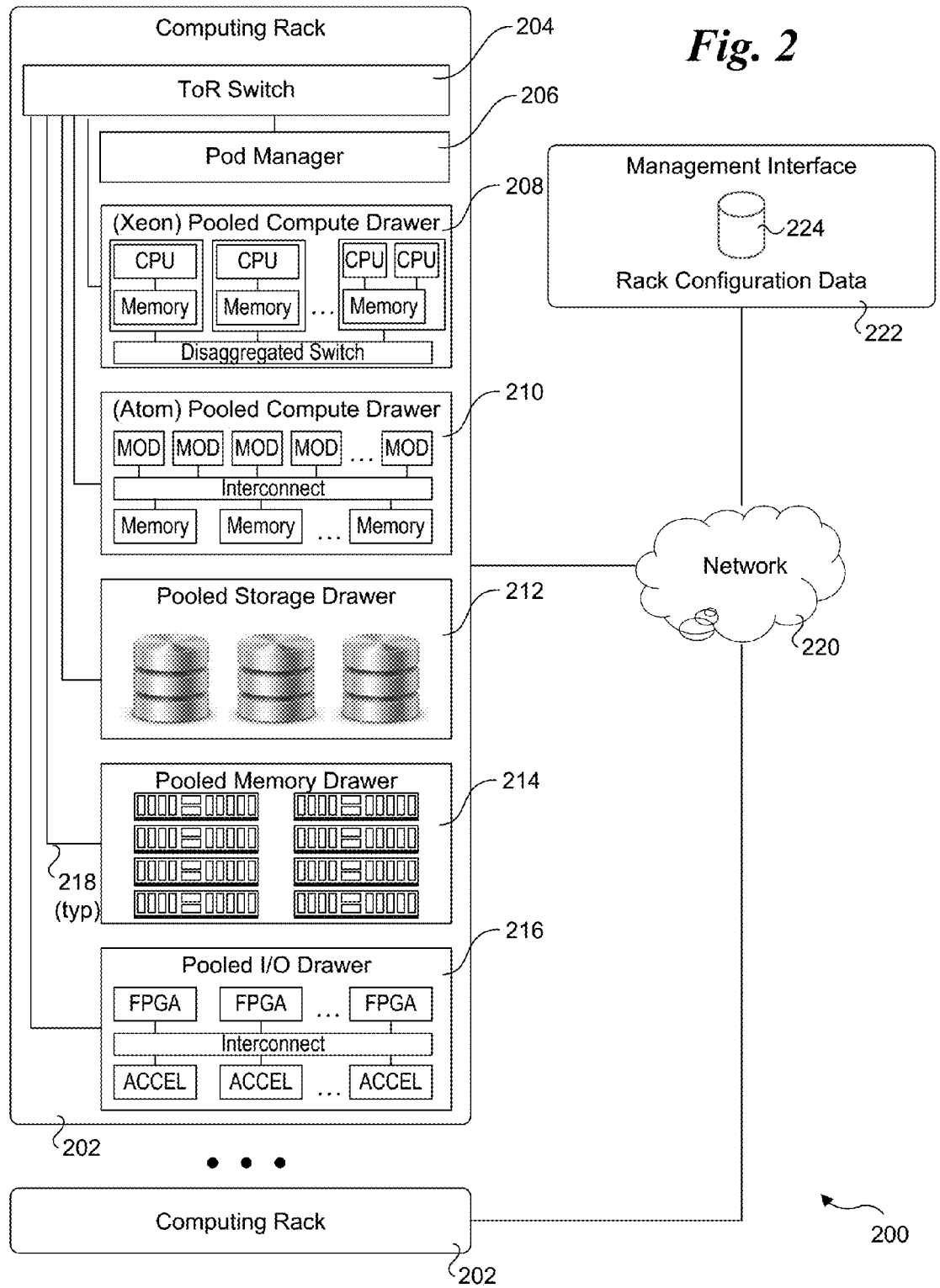
FIG. 2 is a schematic diagram of a Rack Scale Architecture (RSA) configuration in a data center, according to one embodiment.

An exemplary RSA environment 200 is illustrated in FIG. 2. RSA environment 200 includes multiple computing racks 202, each including a ToR switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers and. In the illustrated embodiment the pooled system drawers include an Intel® Xeon® pooled computer drawer 208, and Intel® Atom® pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+ Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSA environment 200 further includes a management interface 222 that is used to manage various aspects of the RSA environment. This includes managing rack configuration, with corresponding parameters stored as rack configuration data 224.

Figure 3:
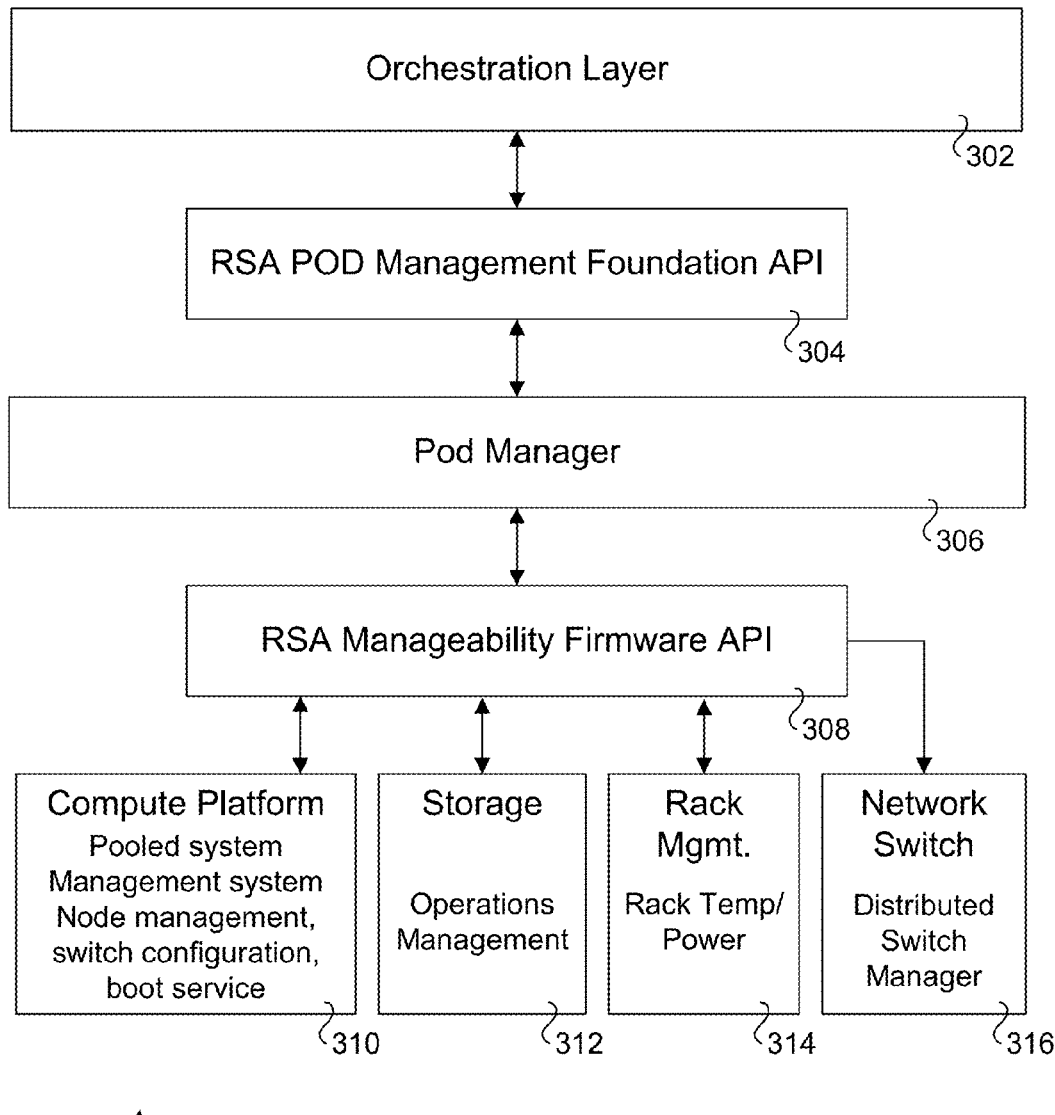
FIG. 3 is a block diagram an RSA management architecture, according to one embodiment.

FIG. 3 shows one embodiment of a RSA management architecture 300. The RSA management architecture includes multiple software and firmware components configured in a layered architecture including an orchestration layer 302, an RSA pod management foundation API (Application Program Interface), a pod manager 306, and an RSA manageability firmware API 308. The bottom layer of RSA management architecture includes a compute platform management component 310, a storage management component 312, a, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

Intel® Rack Scale Architecture is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSA terminology) manager called a Pooled System Management Engine (PSME). The management elements of RSA, RMM and PSMEs are connected to a private network that is not accessible external to the rack, as shown in FIG. 4 and discussed below, The RSA target market expects a highly-available rack as well as a highly-secure rack. This requires the RMM to form the "root of trust" for PSMEs in the rack and provide redundant RMM for high availability. The embodiments discussed and illustrated herein address both of these concerns.

FIG. 4 shows one embodiment of a highly-available (HA) configuration 400 employing dual RMMs 402 and 404 (also labeled RMM1 and RMM2). RMMs 402 and 404 are connected to the rack private management network via a rack management switch 406 and through specifically designated ports 408 in the switch. By designating the ports, rack management switch 406 is always able to identify an RMM verses other management elements. RMMs 402 and 404 are also connected to one another via an RMM-to-RMM link 410.

Each of the pooled system drawers 412 includes a PSME 414, each of which is connected to a designated port 413 on rack management switch 406 via a respective link 415 Each of system drawers 412 also has a respective power zone 416 and thermal zone 418. Each power zone 416 includes associated power sensors and controls 420. Similarly, each thermal zone 418 includes associated thermal sensors and controls 422.

Figure 5A:
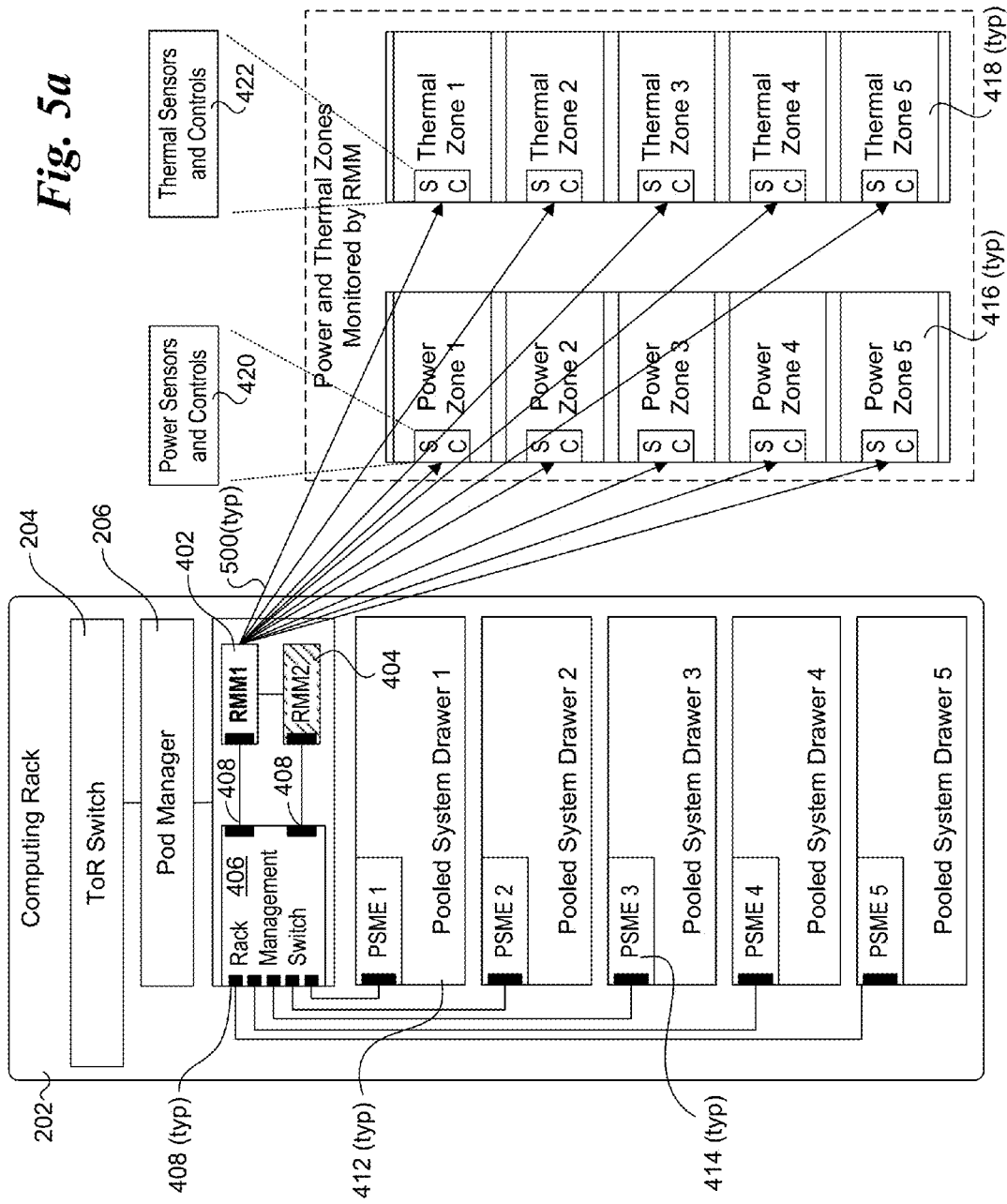
FIG. 5a is a schematic diagram illustrating the RSA rack of FIG. 4 under which RMM1 is operating as a master RMM and RMM2 is operating as a slave RMM.
Figure 5B:
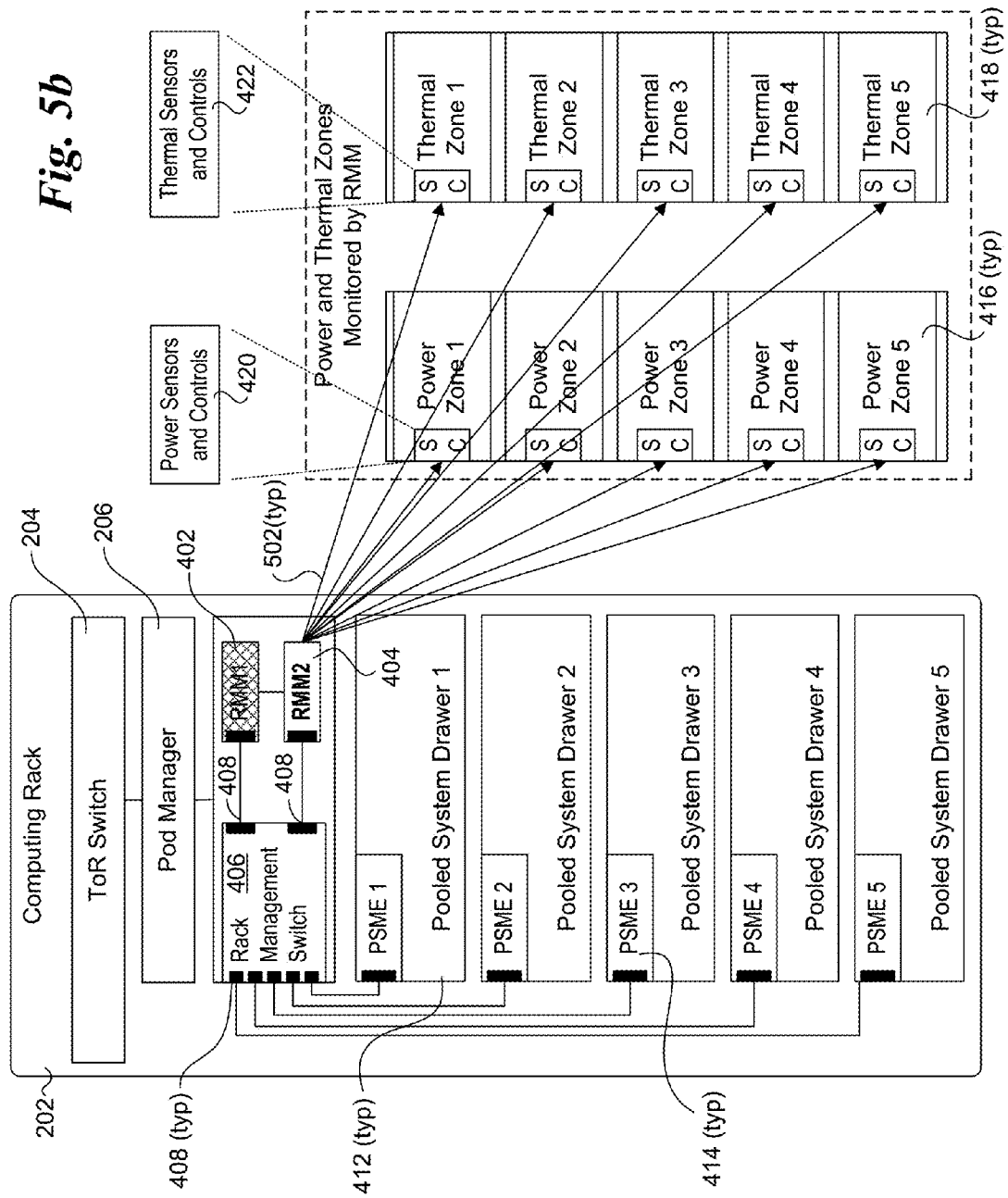
FIG. 5b is a schematic diagram illustrating the RSA rack of FIG. 4 under which RMM1 has failed and RMM2 has taken over the master RMM role following a failover operation.

Through use of designated ports 408, rack management switch 406 is enabled to handle management traffic from an RMM separately from other traffic using other non-designated ports (not shown) on the switch. Each of RMMs 402 and 404 is connected to power sensors and controls 420 and thermal sensors and controls 422, as illustrated by connections 500 and 502 in FIGS. 5a and 5b, respectively. In one embodiment connections 500 and 502 support System Management Bus (SMBus) functionality, enabling the RMMs to monitor and control the power and thermal devices and sensors over SMBus.

RMMs 402 and 404 utilize RMM-to-RMM link 410 for inter-RMM communication to support various configuration and operation functions. For example, one of RMMs 402 and 404 is initially elected to operate as a master RMM to manage the power and thermal controls, while the other RMM is operated as a slave. Internal state synchronization is also performed between the master and slave RMM to enable handover of the master role to the slave in the event of a master RMM failure.

FIG. 4a illustrates an alternative embodiment of an HA configuration 400a employing redundant RMMs that implemented in or otherwise combine with respective PSMEs, as depicted by combination RMM/PSMEs 424-1 and 424-2. Each of RMM/PSMEs is connected to rack management switch 406 via a respective link 415, as before. In one embodiment, the RMMs in the combination RMM/PSMEs 424-1 and 424-2 are enabled to communicate directly over an RMM-to-RMM link 426. Optionally, communications between the RMMs is facilitated via links 415 and rack management switch 406.

In general, the operations of the RMMs in combination RMM/PSMEs 424-1 and 424-2 is similar to RMMs 402 and 404, including master and slave functionality. The primary difference is the functionality of an RMM and PSME is combined using a single component.

Figure 6:
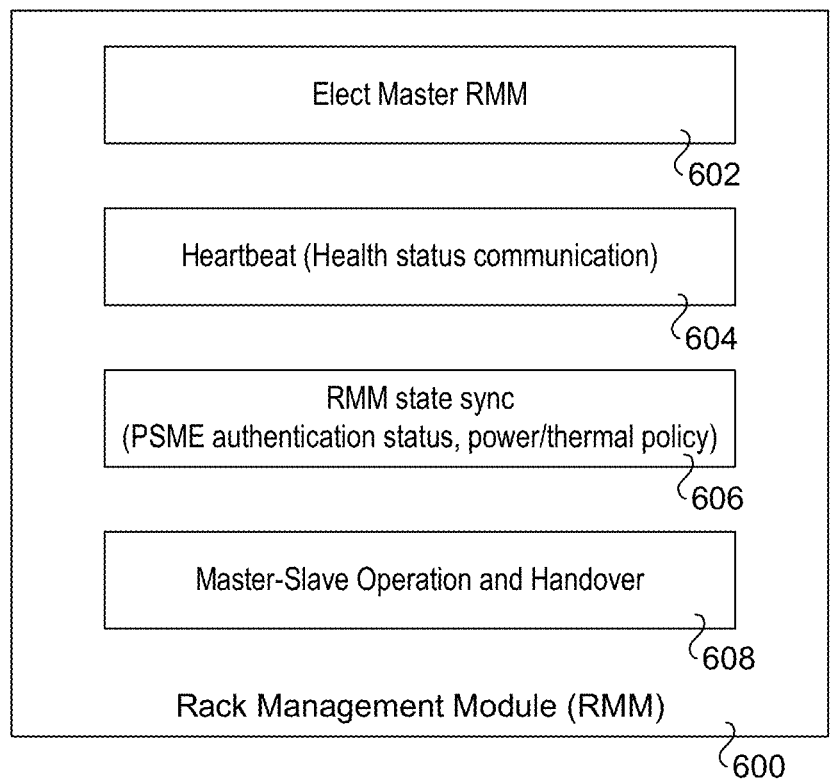
FIG. 6 is a block diagram illustrating logic blocks in an RMM, according to one embodiment.

FIG. 6 shows a block diagram of the logic implemented by an RMM 600, according to one embodiment. The logic blocks includes a block 602 including logic to elect a master RMM, a block 604 including logic for implementing a heartbeat mechanism for detecting health status, an RMM state sync block 606, and a master-slave operation and handover block 608.

Figure 7:
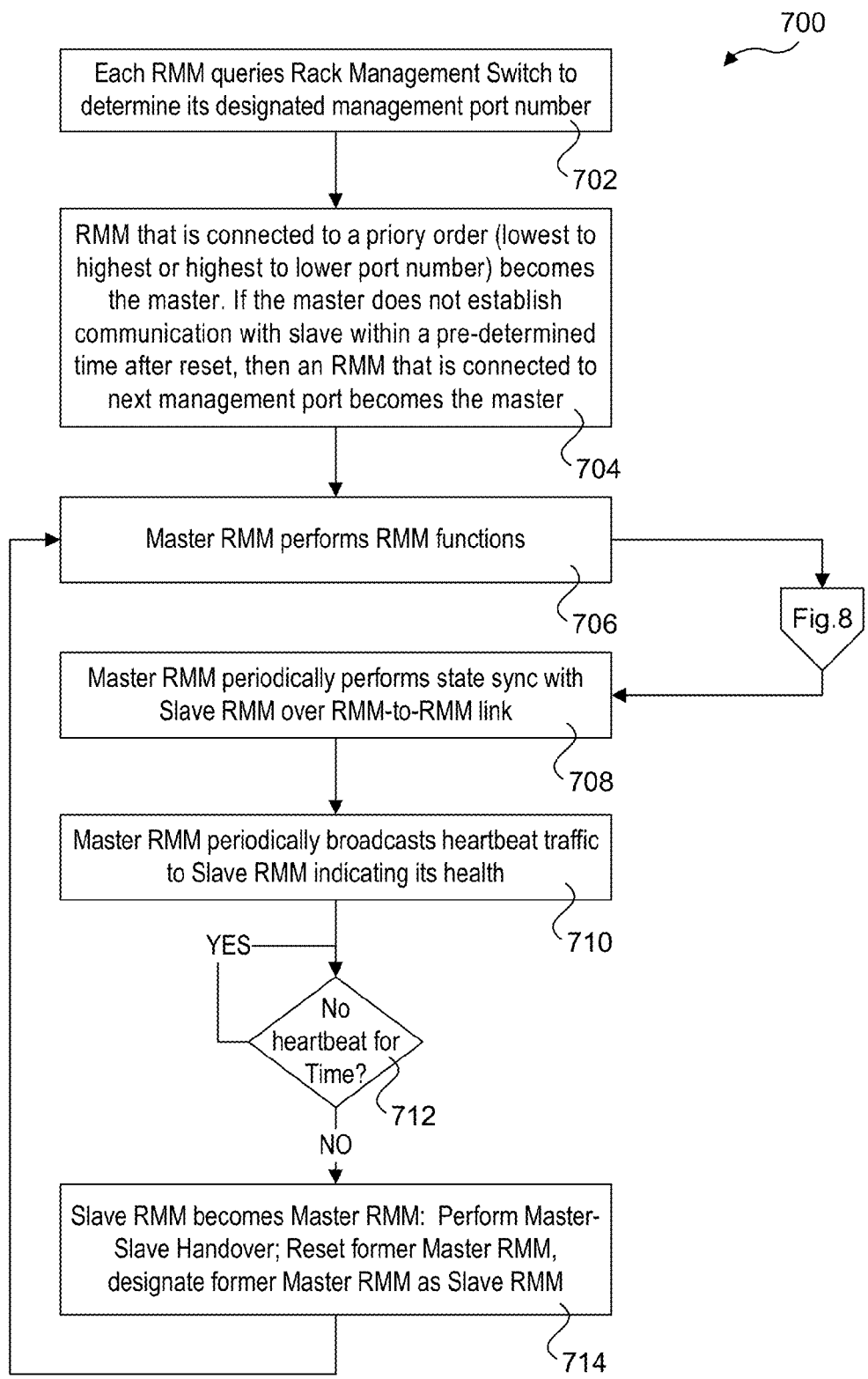
FIG. 7 is a flowchart illustrating operations and logic performed by an RMM during ongoing RSA rack operations, according to one embodiment.

FIG. 7 shows a flowchart 700 illustrating operations and logic performed by RMM 600 during ongoing operations of rack 202, according to one embodiment. The following operations can be extended to apply to more than two RMMs, but for simplicity will be described in the context of using two RMMs. In a block 702 each RMM (e.g., each of RMMs 402 and 404) queries rack management switch 406 to determine its designated management port number. As shown in a block 704, the RMM that is connected to a priory order (lowest to highest or highest to lower port number) become the master RMM, while the next RMM in the priority is designated as the slave RMM. If the master RMM does not establish communication with the slave RMM within a pre-determined time after reset, then an RMM that is connected to next management port (i.e., the slave RMM when using two RMMs) becomes the master RMM.

Figure 8:
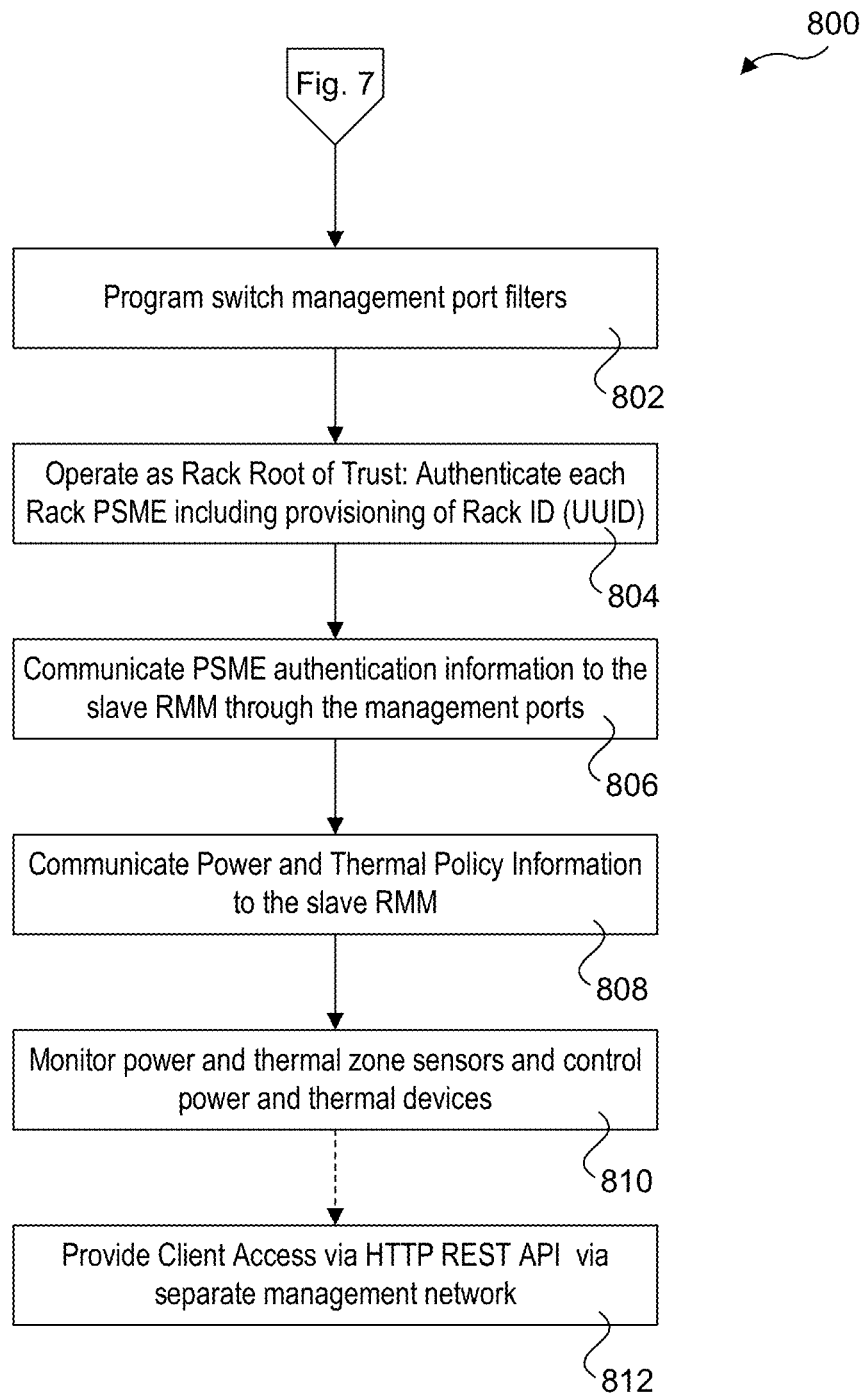
FIG. 8 is a flowchart showing further details of the master RMM functions performed in block 706 of the flowchart of FIG. 7.

Following the initial setup operations in blocks 702 and 704, the remaining operations of blocks 706, 708, and 714 and decision block 712 are performed in an ongoing loop. In bloc 706 the master RMM performs RMM functions, which are described below with reference to flowchart 800 of FIG. 8. In block 708 the master RMM periodically performs state synchronization with the slave RMM over the RMM-to-RMM link. For example, as described below the RMM performs certain management operations, which entail storing various parameters, configuration information, power and thermal zone state data. Accordingly, the data is synchronized such that each of the master and slave RMMs have the same state data, and thus when a master-slave handover occurs, the new master RMM can take over seamlessly.

In block 710, the master RMM periodically broadcasts heartbeat traffic to the slave RMM over the RMM-to-RMM link indicating its health. In one embodiment, the RMM-to-RMM link is a secure link that is configured such that the heartbeat cannot be spoofed. In one embodiment, the RMM-to-RMM link comprises a secure Ethernet link.

In decision block 712 a determination is made by the slave RMM to whether a heartbeat has to be received from the master RMM within a pre-determined time. The heartbeat is used to indicate whether the master is "alive." Thus, if a heartbeat hasn't been received within the pre-determined time, the master RMM is detected to have failed. This failure is addressed in block 714 which performs a master-slave handover (also referred to as a master-slave failover) under which the slave RMM becomes the new master RMM. The former master RMM is reset by the new master RMM and is designated as the slave RMM when it comes out of reset. After the master-slave handover is complete, the logic loops back to block 706, with the new master RMM now performing the operations of the master RMM.

It is noted that a master-slave handover may also be initiated by the master RMM if the master RMM detects that its health is failing. In this case, a failover request is passed from the master RMM to the slave RMM in block 710, and the logic proceeds to block 714 to perform the master-slave failover.

As discussed above, flowchart 800 of FIG. 8 shows the master RMM functions performed in block 706. In a block 802, the master RMM programs the switch management port filters. In one embodiment the master RMM broadcasts management traffic to intended recipients using a broadcast protocol (such as IP (Internet Protocol). Under IP broadcast, a switch (e.g., rack management switch 406) receiving a broadcast packet will forward a copy of the packet to each destination identified in a (previously configured) broadcast list. This filtering operation adds the designated ports of the target recipients (e.g., PSMEs 414) to the broadcast list.

In a block 804, the master RMM operates as the "root of trust" for the rack. It authenticates each of PSMEs 414 and provisions each of the PSMEs with an application Rack identifier (ID). In one embodiment, the Rack ID is a Universally Unique Identifier (UUID).

In a block 806, the master RMM communicates its PSME authentication information to the slave RMM through the management ports. In a block 808 the master RMM communicates the currently thermal and policy information to the slave RMM.

In a block 810 the master RMM performs ongoing monitor and control operations relating to management of power zones 416 and thermal zones 418 for associated pooled system drawers 412. For example, in one embodiment the master RMM periodically receives power and/or thermal policy information from a data center management entity in a higher management level, such as a pod manager. The power and thermal policy may typically include limits on how much power the rack's various compute and storage resources consume (i.e., the collective power consumption of all of the components in the rack). The thermal policy may define a temperature limit for each pooled system drawer, or may define a temperature limit for only those pooled system drawers for which excessive thermal loading is likely, such as pooled compute drawers, which consume the greatest amount of power and generate the most heat. The master RMM monitors the power and thermal levels via its connections to power sensors and controls 420 and thermal sensors and controls 422. Upon detecting an over-limit condition, the RMM can take appropriate action to reduce the power and/or thermal load, as applicable.

The RMM functionality of the RMMs in combination RMM/PSMEs 424-1 and 424-2 in HA configuration 400*a* in FIG. 4*a* is generally similar to that described above for RMMs 402 and 404. In one embodiment, the RMMs in RMM/PSMEs 424-1 and 424-2 are implemented as a master and slave in a similar manner to RMMs 402 and 404. Optionally, the combination RMM/PSMEs 424-1 and 424-2 may be implemented as a master and slave RMM/PSME. Under one embodiment of this configuration, the PSME functionally each of RMM/PSME 424-1 and 424-2 is redundant such that when a combined RMM/PSME is operating as a master, the PSME performs the functionality of both PSME 1 and PSME 2 in under HA configuration 400 of FIG. 4. For example, if combination RMM/PSME 424-1 is operating as a master, RMM/PSME 424-1 operates as the PSME for both pooled system drawer 1 and pooled system drawer 2. Similarly, if a failover of RMM/PSME 424-1 to RMM/PSME 424-2 occurs, RMM/PSME 424-2 becomes the master and operates as the PSME for both pooled system drawer 1 and pooled system drawer 2

In addition to communicating over a private management network, the RMMs may be configured to support interfaces to external clients over a separate network. As depicted in a block 812, in one embodiment client access is provided to an RMM via a REST API (also referred to as a RESTful API) using JSON (JavaScript Object Notation) and/or XML (eXtended Markup Language) data sent over HTTP (hyper-text transport protocol) or HTTPS (HTTP secured) using a separate management network.

Figure 9:
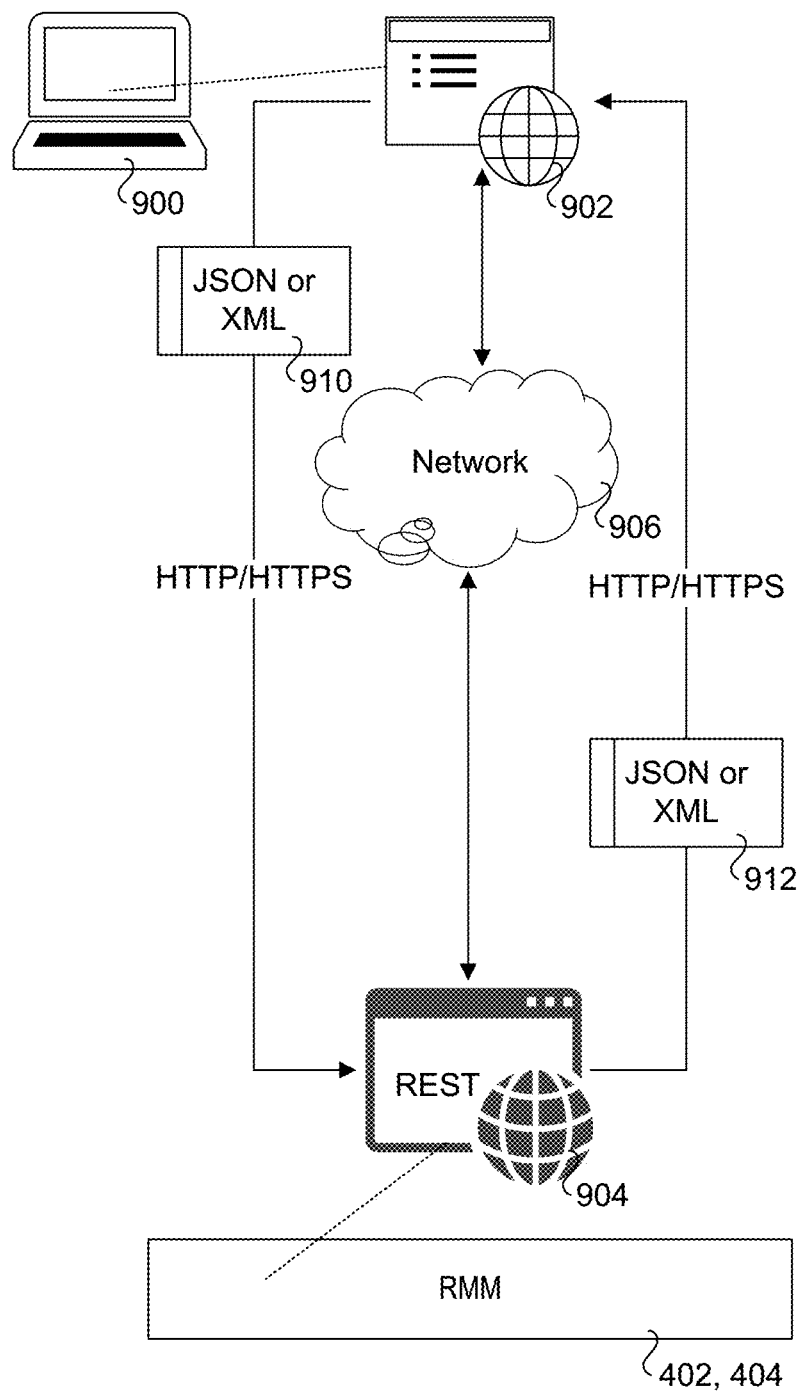
FIG. 9 is a schematic diagram illustrating an implementation of remote RMM access via a RESTful interface.

FIG. 9 shows one embodiment of an implementation supporting the operations of block 812. A client device 900, such as a laptop computer 900 employs a Web browser 902 that access a RESTful Web service 904 that is hosted by RMM 402 or 404. The network communication path between client device 900 and RMM 402, 404 is depicted as a network 906. In practice, the network may include a network that is local to the data center, such as a data center LAN (local area network), or it may include a network portion that extends outside of the data center, such as the Internet or a private network. Network access to the RMM may generally be facilitated by one or more of switches in the data center, including the ToR switch for the rack. In turn, the network connection may include a link between the ToR switch and rack management switch 406 and then another link between the rack management switch and RMMs 402 and 404 (not shown). To ensure communication from client device 900 are kept separate, the links between rack management switch 406 and RMMs 402 and 404 do not use the designated ports discussed above.

REST (representative state transfer) and RESTful APIs are typically implemented as a Web service that enables remote clients to access resources available via the RESTful API host. REST uses HTTP or HTTPS verbs (GET, POST, PUT, DELETE, etc.), and thus can be implemented using a Web browser on the client side. HTTP and HTTPS uses a request/response paradigm, with an HTTP client making an HTTP request, and the HTTP server return an HTTP response to the HTTP request, such as illustrated by an HTTP request 910 and an HTTP response 912 in FIG. 9.

Under a RESTful Web service, the data contained in the HTTP request and responses may by JSON object, XML objects, or a mix of both. Using an HTTP POST or PUT enables the RESTful Web service client to send information to the RMM via Restful API 904, such as configuration information. Using an HTTP GET enables the RESTful Web service client to retrieve data from the RMM via Restful API 904. In this manner, client 900 can access RMMs 402 and 404 via Web browser 904 and network 906.

As an alternative to a RESTful API, an RMM may implement a SOAP (Simple Object Access Protocol) Web service. SOAP uses XML-based messages, and uses Web Service Description Language (WSDL) objects to define the Web service application interfaces. Both of REST and SOAP are well-known in the Web services art, therefore no further discussion is provided herein.

Further aspects of the subject matter described herein are set out in the following numbered clauses:

1. A method for managing rack resources in a data center rack, comprising employing first and second Rack Management Modules (RMMs) to manage power and thermal zones in a rack including a plurality of pooled system drawers, each pooled system drawer associated with a respective power zone including one or more power sensors and one or more power control devices and a respective thermal zone including one or more thermal sensors and one or more thermal devices;

implementing one of a first and second RMMs as an initial master RMM and other RMM as an initial slave RMM;

monitoring the power and thermal zones in the rack via a master RMM;

periodically synchronizing state information between the master RMM and the slave RMM;

detecting a fail-over condition for the master RMM, and in response thereto, implementing the initial slave RMM as a new master RMM;

resetting the initial master RMM; and implementing the initial master RMM as a new slave RMM.

2. The method of clause 1, wherein the detecting the fail-over condition comprises:

periodically sending heartbeat information from a current master RMM to a current slave RMM;

detecting at the current slave RMM that heartbeat information has not been received for a pre-determined time; and in response thereto, initiating a fail-over operation under which the current slave RMM becomes a new master RMM.

3. The method of clause 1 or 2, wherein the detecting the fail-over condition comprises:

periodically sending health information from a current master RMM to a current slave RMM;

detecting that the current master RMM is failing or has failed; and in response thereto, initiating a fail-over operation under which the current slave RMM becomes a new master RMM 4. The method of any of the preceding clauses, wherein the rack includes a Top of Rack (ToR) switch that is connected to each of the plurality of the pooled system drawers via a plurality of communication links, and wherein the master and slave RMMs perform operations relating to management of the power and thermal zones using a private network that includes communication links that are separate from the communication links between the ToR switch and the plurality of pooled system drawers.

5. The method of any of the preceding clauses, further comprising:

communicatively coupling each of the first and second RMMs via respective links to a rack management switch;

communicatively coupling the first RMM to the second RMM via a RMM-to-RMM link between the first and second RMMs;

implementing a respective Pooled System Management Engine (PSME) for each of the plurality of pooled system drawers; and communicatively coupling each of the PSMEs to the rack management switch, wherein each of the first and second RMMs are enabled to communicate with each of the PSMEs via the rack management switch.

6. The method of clause 5, wherein the rack management switch includes a plurality of ports and the method further comprises:

identifying designated ports on the rack management switch to support communication between the first and second RMMs and the plurality of PSMEs, wherein each PSME is communicatively coupled to a respective designated port on the rack management switch via a respective communication link, and each of the first and second RMMs is communicatively coupled to a respective designated port in the rack management switch via a respective communication link.

7. The method of clause 5, further comprising:

authenticating, via the master RMM, each of the plurality of PSMEs, generating corresponding PSME authentication information; and communicating the PSME authentication information to the slave RMM.

8. The method of clause 5, further comprising:

implementing communication traffic between the first and second RMMs and the plurality of PSMEs via a private network comprising the rack management switch and the communication links between the plurality of PSMEs and the rack management switch and the communication links between the first and second RMMs and the rack management switch; and hosting a Web service via at least one of the first and second RMMs that enables a client to access information relating to operation of an RMM via a Web browser using a network that is separate from the private network.

9. The method of clause 5, wherein the first and second RMMs are implemented in respective first and second PSMEs.

10. The method of any of the preceding clauses, further comprising:

initializing each of first and second RMMs; and determining which of the first and second RMM is to be the initial master RMM and which of the first and second RMMs is to be the initial slave RMM.

11. A rack management module (RMM), configured to be implemented in a rack including a plurality of pooled system drawers, each pooled system drawer associated with a respective power zone including one or more power sensors and one or more power control devices and a respective thermal zone including one or more thermal sensors and one or more thermal devices, the RMM comprising circuitry and logic configured to operate the RMM as master RMM and a slave RMM at separate points in time, wherein when the RMM is operating as a master RMM the RMM is configured to, manage the power and thermal zones for each of the plurality of pooled system drawers, including maintaining power zone and thermal zone state information;

periodically synchronize power zone and thermal zone state information between the master RMM and another RMM operated as a slave RMM; and perform a fail-over operation under a master RMM role is transferred from the RMM to the slave RMM;

and wherein when the RMM is operating as a slave RMM the RMM is configured to detect a fail-over condition for the master RMM, and in response thereto, implement the RMM as a new master RMM; and reset the master RMM for which the fail-over condition is detected.

12. The RMM of clause 11, wherein the RMM, when operating as a master RMM the RMM is configured to:

periodically send heartbeat information to an RMM operating as a slave RMM; and when operating as a slave RMM, the RMM is further configured to, receive heartbeat information from a current master RMM;

detect at that heartbeat information has not been received for a pre-determined time; and in response thereto, initiate a fail-over operation under which the RMM becomes a new master RMM.

13. The RMM of clause 11 or 12, wherein the RMM, when operating as a master RMM the RMM is configured to:

periodically send health information to an RMM operating as a slave RMM; and when operating as a slave RMM, the RMM is further configured to, detect that a current master RMM is failing or has failed; and in response thereto, initiate a fail-over operation under which the RMM becomes a new master RMM.

14. The RMM of any of clauses 11-13, wherein the RMM includes further circuitry and logic to:

receive a reset signal, and in response thereto, perform initialization operations including communicating with at least one of another RMM and a rack management switch to determine that the RMM should operate as a slave RMM.

15. The RMM any of clauses 11-14, wherein the rack further includes a rack management switch and a second RMM, and the RMM further comprises:

a first port configured to link the RMM in communication with the rack management switch via a first link when the RMM is installed in the rack; and a second port configured to link the RMM in direct communication with the second RMM via a second link comprising an RMM-to-RMM link when the RMM is installed in the rack.

16. The RMM of clause 15, wherein each pooled system drawer includes a Pooled System Management Engine (PSME) that is linked in communication with the rack management switch, and wherein the RMM is configured, when the RMM is installed in the rack, to be connected to the rack management switch via the first link and to the second RMM via the RMM-to-RMM link, and the RMM further comprises logic and circuitry configured, when operating as a master RMM, to:

authenticate, via communications sent to the rack management switch via the first link, each of the plurality of PSMEs, and generate corresponding PSME authentication information; and communicate the PSME authentication information to the second RMM via the RMM-to-RMM link.

17. The RMM of clause 15, wherein the RMM is further configured, when installed in the rack, to:

perform an initialization operation; and determine, in connection with the initialization operation, whether it is to operate as a master RMM or a slave RMM, wherein the determination is made using at least of communications with the rack management server and communications with the second RMM.

18. The RMM of clause 15, wherein when the RMM is installed in the rack it is configured to communicate with the rack management switch using a private network including the first link, wherein the RMM further comprises a third port for communicating with a second network that is separate from the private network, and the RMM is further configured to host a Web service that enables a client to access information relating to operation of the RMM via a Web browser using communications sent over the second network.

19. A system comprising:

a rack, including a plurality of pooled system drawers, each pooled system drawer associated with a respective power zone including one or more power sensors and one or more power control devices and a respective thermal zone including one or more thermal sensors and one or more thermal devices;

first and second rack management modules (RMMs), linked in communication via an RMM-to-RMM link, each RMM linked in communication with at least one power sensor and the at least one power control device in each of the respective power zones and linked in communication with at least one thermal sensor and at least one thermal device in each respective thermal zone;

wherein the system is further configured to.

implement one of a first and second RMMs as an initial master RMM and other RMM as an initial slave RMM;

monitor the power and thermal zones in the rack via a master RMM;

periodically synchronize state information between the master RMM and the slave RMM; and detect a fail-over condition for the master RMM, and in response thereto, implement the initial slave RMM as a new master RMM;

reset the initial master RMM; and implement the initial master RMM as a new slave RMM.

20. The system of clause 19, wherein the first and second RMMs are further configured to:

periodically send health information from a current master RMM to a current slave RMM over the RMM-to-RMM link;

detect that the current master RMM is failing or has failed; and in response thereto, initiate a fail-over operation under which the current slave RMM becomes a new master RMM 21. The system of clause 19 or 20, wherein the rack includes a Top of Rack (ToR) switch that is connected to each of the plurality of pooled system drawers via a plurality of communication links, and wherein the master and slave RMMs perform operations relating to management of the power and thermal zones using a private network that includes communication links that are separate from the communication links between the ToR switch and the plurality of pooled system drawers.

22. The system of any of clauses 19-21, further comprising:

a rack management switch, linked in communication with each of the first and second RMMs via respective links; and a respective Pooled System Management Engine (PSME) for each of the plurality of pooled system drawers, each PSME linked in communication with the rack management switch, wherein each of the first and second RMMs are enabled to communicate with each of the PSMEs via the rack management switch.

23. The system of clause 22, wherein the rack management switch includes a plurality of ports and the system is further configured to:

identify designated ports on the rack management switch to support communication between the first and second RMMs and the plurality of PSMEs, wherein each PSME is communicatively coupled to a respective designated port on the rack management switch via a respective communication link, and each of the first and second RMMs is communicatively coupled to a respective designated port in the rack management switch via a respective communication link.

24. The system of clause 22, wherein the system is further configured to:

authenticate, via a current master RMM, each of the plurality of PSMEs, and generate corresponding PSME authentication information; and communicate the PSME authentication information to a current slave RMM.

25. The system of clause 22, wherein the first and second RMMs are configured to communicate with the rack management switch and the PSMEs using a private network, wherein at least one RMM further includes a port to connect to a second network that is separate from the private network, and the at least one RMM is further configured to host a Web service that enables a client to access information relating to operation of the RMM via a Web browser using communications sent over the second network.

26. A method for managing rack resources in a data center rack, comprising employing a first and second combined Rack Management Module and Pooled System Management Engine (RMM/PSME) to manage power and thermal zones in a rack including a plurality of pooled system drawers, each pooled system drawer associated with a respective power zone including one or more power sensors and one or more power control devices and a respective thermal zone including one or more thermal sensors and one or more thermal devices;

implementing one of a first and second RMM/PSMEs as an initial master RMM/PSME and other RMM/PSME as an initial slave RMM/PSME;

monitoring the power and thermal zones in the rack via a master RMM/PSME;

periodically synchronizing state information between the master RMM/PSME and the slave RMM/PSME;

detecting a fail-over condition for the master RMM/PSME, and in response thereto, implementing the initial slave RMM/PSME as a new master RMM/PSME;

resetting the initial master RMM/PSME; and implementing the initial master RMM/PSME as a new slave RMM/PSME.

27. The method of clause 26, wherein the detecting the fail-over condition comprises:

periodically sending heartbeat information from a current master RMM/PSME to a current slave RMM/PSME;

detecting at the current slave RMM/PSME that heartbeat information has not been received for a pre-determined time; and in response thereto, initiating a fail-over operation under which the current slave RMM/PSME becomes a new master RMM/PSME.

28. The method of clause 26 or 27, wherein the detecting the fail-over condition comprises:

periodically sending health information from a current master RMM/PSME to a current slave RMM/PSME;

detecting that the current master RMM/PSME is failing or has failed; and in response thereto, initiating a fail-over operation under which the current slave RMM/PSME becomes a new master RMM/PSME 29. The method of any of clauses 26-28, wherein the rack includes a Top of Rack (ToR) switch that is connected to each of the plurality of the pooled system drawers via a plurality of communication links, and wherein the master and slave RMM/PSMEs perform operations relating to management of the power and thermal zones using a private network that includes communication links that are separate from the communication links between the ToR switch and the plurality of pooled system drawers.

30. The method of any of clauses 26-29, further comprising:

communicatively coupling each of the first and second RMM/PSMEs via respective links to a rack management switch;

communicatively coupling the first RMM/PSME to the second RMM/PSME via a RMM/PSME-to-RMM/PSME link between the first and second RMM/PSMEs;

implementing the first and second RMM/PSME in a respective first and second pooled system drawer;

implementing a respective PSME for each of the plurality of pooled system drawers not including the first and second pooled system drawers; and communicatively coupling each of the PSMEs to the rack management switch, wherein each of the first and second RMM/PSMEs are enabled to communicate with each of the PSMEs via the rack management switch.

31. The method of clause 30, wherein the rack management switch includes a plurality of ports and the method further comprises:

identifying designated ports on the rack management switch to support communication between the first and second RMM/PSMEs and the plurality of PSMEs, wherein each PSME is communicatively coupled to a respective designated port on the rack management switch via a respective communication link, and each of the first and second RMM/PSMES is communicatively coupled to a respective designated port in the rack management switch via a respective communication link.

32. The method of clause 30 or 31, further comprising:

authenticating, via the master RMM/PSME, each of the plurality of PSMEs, generating corresponding PSME authentication information; and communicating the PSME authentication information to the slave RMM/PSME.

33. The method of any of clauses 30-32, further comprising:

implementing communication traffic between the first and second RMM/PSMEs and the plurality of PSMEs via a private network comprising the rack management switch and the communication links between the plurality of PSMEs and the rack management switch and the communication links between the first and second RMM/PSMEs and the rack management switch; and hosting a Web service via at least one of the first and second RMM/PSMEs that enables a client to access information relating to operation of an RMM/PSME via a Web browser using a network that is separate from the private network.

34. The method of any of clauses 30-33, further comprising communicatively coupling the first RMM/PSME to the second RMM/PSME via a RMM/PSME-to-RMM/PSME link between the first and second RMM/PSMEs;

35. The method of any of clauses 26-33, further comprising:

initializing each of first and second RMM/PSMEs; and determining which of the first and second RMM/PSME is to be the initial master RMM/PSME and which of the first and second RMM/PSMEs is to be the initial slave RMM/PSME.

36. A combined rack management module and Pooled System Management Engine (RMM/PSME), configured to be implemented in a rack including a plurality of pooled system drawers, each pooled system drawer associated with a respective power zone including one or more power sensors and one or more power control devices and a respective thermal zone including one or more thermal sensors and one or more thermal devices, the RMM/PSME comprising circuitry and logic configured to operate the RMM/PSME as master RMM/PSME and a slave RMM/PSME at separate points in time, wherein when the RMM/PSME is operating as a master RMM/PSME the RMM/PSME is configured to, manage the power and thermal zones for each of the plurality of pooled system drawers, including maintaining power zone and thermal zone state information;

periodically synchronize power zone and thermal zone state information between the master RMM/PSME and another RMM/PSME operated as a slave RMM/PSME; and perform a fail-over operation under a master RMM/PSME role is transferred from the RMM/PSME to the slave RMM/PSME;

and wherein when the RMM/PSME is operating as a slave RMM/PSME the RMM/PSME is configured to detect a fail-over condition for the master RMM/PSME, and in response thereto, implement the RMM/PSME as a new master RMM/PSME; and reset the master RMM/PSME for which the fail-over condition is detected.

37. The RMM/PSME of clause 36, wherein the RMM/PSME, when operating as a master RMM/PSME the RMM/PSME is configured to:

periodically send heartbeat information to an RMM/PSME operating as a slave RMM/PSME; and when operating as a slave RMM/PSME, the RMM/PSME is further configured to, receive heartbeat information from a current master RMM/PSME;

detect at that heartbeat information has not been received for a pre-determined time; and in response thereto, initiate a fail-over operation under which the RMM/PSME becomes a new master RMM/PSME.

38. The RMM/PSME of clause 36 or 37, wherein the RMM/PSME, when operating as a master RMM/PSME the RMM/PSME is configured to:

periodically send health information to an RMM/PSME operating as a slave RMM/PSME; and when operating as a slave RMM/PSME, the RMM/PSME is further configured to, detect that a current master RMM/PSME is failing or has failed; and in response thereto, initiate a fail-over operation under which the RMM/PSME becomes a new master RMM/PSME.

39. The RMM/PSME of any of clauses 36-38, wherein the RMM/PSME includes further circuitry and logic to:

receive a reset signal, and in response thereto, perform initialization operations including communicating with at least one of another RMM/PSME and a rack management switch to determine that the RMM/PSME should operate as a slave RMM/PSME.

40. The RMM/PSME any of clauses 36-39, wherein the rack further includes a rack management switch and a second RMM/PSME, and the RMM/PSME further comprises:

a first port configured to link the RMM/PSME in communication with the rack management switch via a first link when the RMM/PSME is installed in the rack; and a second port configured to link the RMM/PSME in direct communication with the second RMM/PSME via a second link comprising an RMM/PSME-to-RMM/PSME link when the RMM/PSME is installed in the rack.

41. The RMM/PSME of clause 40, wherein the first and second RMM/PSME are included in respective first and second pooled system drawers, and each of a plurality of other pooled system drawer includes a PSME that is linked in communication with the rack management switch, and wherein the RMM/PSME is configured, when the RMM/PSME is installed in the rack, to be connected to the rack management switch via the first link and to the second RMM/PSME via the RMM/PSME-to-RMM/PSME link, and the RMM/PSME further comprises logic and circuitry configured, when operating as a master RMM/PSME, to:

authenticate, via communications sent to the rack management switch via the first link, each of the plurality of PSMEs, and generate corresponding PSME authentication information; and communicate the PSME authentication information to the second RMM/PSME via the RMM/PSME-to-RMM/PSME link.

42. The RMM/PSME of clause 40, wherein the RMM/PSME is further configured, when installed in the rack, to:

perform an initialization operation; and determine, in connection with the initialization operation, whether it is to operate as a master RMM/PSME or a slave RMM/PSME, wherein the determination is made using at least of communications with the rack management server and communications with the second RMM/PSME.

43. The RMM/PSME of clause 40, wherein when the RMM/PSME is installed in the rack it is configured to communicate with the rack management switch using a private network including the first link, wherein the RMM/PSME further comprises a third port for communicating with a second network that is separate from the private network, and the RMM/PSME is further configured to host a Web service that enables a client to access information relating to operation of the RMM/PSME via a Web browser using communications sent over the second network.

44. A system comprising:

a rack, including a plurality of pooled system drawers, each pooled system drawer associated with a respective power zone including one or more power sensors and one or more power control devices and a respective thermal zone including one or more thermal sensors and one or more thermal devices;

first and second combined rack management module and Pooled System Management Engines (RMM/PSMEs), linked in communication via an RMM/PSME-to-RMM/PSME link, each RMM/PSME linked in communication with at least one power sensor and the at least one power control device in each of the respective power zones and linked in communication with at least one thermal sensor and at least one thermal device in each respective thermal zone;

wherein the system is further configured to.

implement one of a first and second RMM/PSMEs as an initial master RMM/PSME and other RMM/PSME as an initial slave RMM/PSME;

monitor the power and thermal zones in the rack via a master RMM/PSME;

periodically synchronize state information between the master RMM/PSME and the slave RMM/PSME; and detect a fail-over condition for the master RMM/PSME, and in response thereto, implement the initial slave RMM/PSME as a new master RMM/PSME;

reset the initial master RMM/PSME; and implement the initial master RMM/PSME as a new slave RMM/PSME.

45. The system of clause 44, wherein the first and second RMM/PSMEs are further configured to:

periodically send health information from a current master RMM/PSME to a current slave RMM/PSME over the RMM/PSME-to-RMM/PSME link;

detect that the current master RMM/PSME is failing or has failed; and in response thereto, initiate a fail-over operation under which the current slave RMM/PSME becomes a new master RMM/PSME 46. The system of clause 44 or 45, wherein the rack includes a Top of Rack (ToR) switch that is connected to each of the plurality of the pooled system drawers via a plurality of communication links, and wherein the master and slave RMM/PSMEs perform operations relating to management of the power and thermal zones using a private network that includes communication links that are separate from the communication links between the ToR switch and the plurality of pooled system drawers.

47. The system of any of clauses 44-46, wherein the first and second RMM/PSME is implemented in respective first and second pooled system drawers of the plurality of pooled system drawers, the system further comprising:

a rack management switch, linked in communication with each of the first and second RMM/PSMEs via respective links; and a respective Pooled System Management Engine (PSME) for each of the plurality of pooled system drawers not including the first and second pooled system drawers, each PSME linked in communication with the rack management switch, wherein each of the first and second RMM/PSMEs are enabled to communicate with each of the PSMEs via the rack management switch.

48. The system of clause 47, wherein the rack management switch includes a plurality of ports and the system is further configured to:

identify designated ports on the rack management switch to support communication between the first and second RMM/PSMEs and the plurality of PSMEs, wherein each PSME is communicatively coupled to a respective designated port on the rack management switch via a respective communication link, and each of the first and second RMM/PSMEs is communicatively coupled to a respective designated port in the rack management switch via a respective communication link.

49. The system of clause 47, wherein the system is further configured to:

authenticate, via a current master RMM/PSME, each of the plurality of PSMEs, and generate corresponding PSME authentication information; and communicate the PSME authentication information to a current slave RMM/PSME.

50. The system of clause 49, wherein the first and second RMM/PSMEs are configured to communicate with the rack management switch and the PSMEs using a private network, wherein at least one RMM/PSME further includes a port to connect to a second network that is separate from the private network, and the at least one RMM/PSME is further configured to host a Web service that enables a client to access information relating to operation of the RMM/PSME via a Web browser using communications sent over the second network.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for managing rack resources in a data center rack, comprising:
    employing first and second Rack Management Modules (RMMs) to manage power and thermal zones in a rack including a plurality of pooled system drawers, each pooled system drawer associated with a respective power zone including one or more power sensors and one or more power control devices and a respective thermal zone including one or more thermal sensors and one or more thermal devices;
    implementing one of the first and second RMM as an initial master RMM and the other RMM as an initial slave RMM;
    when an RMM is being implemented as a master RMM, monitoring the power and thermal zones in the rack by,
        receiving power data from one or more power sensors for each power zone;
        receiving thermal data from one or more thermal sensors for each thermal zone; and
        communicating with at least one of,
            one or more power control devices for each of one or more power zones to control power in that power zone; and
            one or more thermal devices for each of one or more thermal zones to control operation of the one or more thermal devices;
    maintaining power and thermal zone state information for each pooled system drawer; and
    periodically synchronizing power zone and thermal zone state information between the master RMM and the slave RMM;
    detecting a fail-over condition for the master RMM, and in response thereto,
        implementing the initial slave RMM as a new master RMM;
        resetting the initial master RMM; and
        implementing the initial master RMM as a new slave RMM.

2. The method of claim 1, wherein the detecting the fail-over condition comprises:
    periodically sending heartbeat information from a current master RMM to a current slave RMM;
    detecting at the current slave RMM that heartbeat information has not been received for a pre-determined time; and
    in response thereto, initiating a fail-over operation under which the current slave RMM becomes a new master RMM.

3. The method of claim 1, wherein the detecting the fail-over condition comprises:
    periodically sending health information from a current master RMM to a current slave RMM;
    detecting that the current master RMM is failing or has failed; and
    in response thereto, initiating a fail-over operation under which the current slave RMM becomes a new master RMM.

4. The method of claim 1, wherein the rack includes a Top of Rack (ToR) switch that is connected to each of the plurality of the pooled system drawers via a plurality of communication links, and wherein the master and slave RMMs perform operations relating to management of the power and thermal zones using a private network that includes communication links that are separate from the communication links between the ToR switch and the plurality of pooled system drawers.

5. The method of claim 1, further comprising:
    communicatively coupling each of the first and second RMMs via respective links to a rack management switch;
    communicatively coupling the first RMM to the second RMM via a RMM-to-RMM link between the first and second RMMs;
    implementing a respective Pooled System Management Engine (PSME) for each of the plurality of pooled system drawers; and
    communicatively coupling each of the PSMEs to the rack management switch,
    wherein each of the first and second RMMs are enabled to communicate with each of the PSMEs via the rack management switch.

6. The method of claim 5, wherein the rack management switch includes a plurality of ports and the method further comprises:
    identifying designated ports on the rack management switch to support communication between the first and second RMMs and the plurality of PSMEs, wherein each PSME is communicatively coupled to a respective designated port on the rack management switch via a respective communication link, and each of the first and second RMMs is communicatively coupled to a respective designated port in the rack management switch via a respective communication link.

7. The method of claim 5, further comprising:
    authenticating, via the master RMM, each of the plurality of PSMEs, generating corresponding PSME authentication information; and
    communicating the PSME authentication information to the slave RMM.

8. The method of claim 5, further comprising:
    implementing communication traffic between the first and second RMMs and the plurality of PSMEs via a private network comprising the rack management switch and the communication links between the plurality of PSMEs and the rack management switch and the communication links between the first and second RMMs and the rack management switch; and
    hosting a Web service via at least one of the first and second RMMs that enables a client to access information relating to operation of an RMM via a Web browser using a network that is separate from the private network.

9. The method of claim 5, wherein the first and second RMMs are implemented in respective first and second PSMEs.

10. The method of claim 1, further comprising:
initializing each of first and second RMMs; and
determining which of the first and second RMM is to be the initial master RMM and which of the first and second RMMs is to be the initial slave RMM.

11. A rack management module (RMM), configured to be implemented in a rack including a plurality of pooled system drawers, each pooled system drawer associated with a respective power zone including one or more power sensors and one or more power control devices and a respective thermal zone including one or more thermal sensors and one or more thermal devices, the RMM including one or more communications ports and comprising circuitry and logic configured to operate the RMM as a master RMM and a slave RMM at separate points in time,
wherein when the RMM is operating as a master RMM the RMM is configured to,
manage the power and thermal zones for each of the plurality of pooled system drawers, including,
receiving power data from one or more power sensors for each power zone;
receiving thermal data from one or more thermal sensors for each thermal zone;
communicating with at least one of,
one or more power control devices for each of one or more power zones to control power in that power zone; and
one or more thermal devices for each of one or more thermal zones to control operation of the one or more thermal devices; and
maintaining power zone and thermal zone state information relating to management of the power and thermal zones;
periodically synchronize power zone and thermal zone state information between the master RMM and another RMM operated as a slave RMM; and
perform a fail-over operation under which a master RMM role is transferred from the RMM to the slave RMM;
and wherein when the RMM is operating as a slave RMM the RMM is configured to detect a fail-over condition for the master RMM, and in response thereto,
implement the RMM as a new master RMM; and
reset the master RMM for which the fail-over condition is detected.

12. The RMM of claim 11, wherein the RMM, when operating as a master RMM the RMM is configured to:
periodically send heartbeat information to an RMM operating as a slave RMM; and
when operating as a slave RMM, the RMM is further configured to,
receive heartbeat information from a current master RMM;
detect at that heartbeat information has not been received for a pre-determined time; and
in response thereto, initiate a fail-over operation under which the RMM becomes a new master RMM.

13. The RMM of claim 11, wherein the RMM, when operating as a master RMM the RMM is configured to:
periodically send health information to an RMM operating as a slave RMM; and
when operating as a slave RMM, the RMM is further configured to,
detect that a current master RMM is failing or has failed; and
in response thereto, initiate a fail-over operation under which the RMM becomes a new master RMM.

14. The RMM of claim 11, wherein the RMM includes further circuitry and logic to:
receive a reset signal, and in response thereto,
perform initialization operations including communicating with at least one of another RMM and a rack management switch to determine that the RMM should operate as a slave RMM.

15. The RMM of claim 11, wherein the rack further includes a rack management switch and a second RMM, and wherein the one or more communications ports comprise:
a first port configured to link the RMM in communication with the rack management switch via a first link when the RMM is installed in the rack; and
a second port configured to link the RMM in direct communication with the second RMM via a second link comprising an RMM-to-RMM link when the RMM is installed in the rack.

16. The RMM of claim 15, wherein each pooled system drawer includes a Pooled System Management Engine (PSME) that is linked in communication with the rack management switch, and wherein the RMM is configured, when the RMM is installed in the rack, to be connected to the rack management switch via the first link and to the second RMM via the RMM-to-RMM link, and the RMM further comprises logic and circuitry configured, when operating as a master RMM, to:
authenticate, via communications sent to the rack management switch via the first link, each of the plurality of PSMEs, and generate corresponding PSME authentication information; and
communicate the PSME authentication information to the second RMM via the RMM-to-RMM link.

17. The RMM of claim 15, wherein the RMM is further configured, when installed in the rack, to:
perform an initialization operation; and
determine, in connection with the initialization operation, whether it is to operate as a master RMM or a slave RMM, wherein the determination is made using at least of communications with the rack management server and communications with the second RMM.

18. The RMM of claim 15, wherein when the RMM is installed in the rack it is configured to communicate with the rack management switch using a private network including the first link, wherein the RMM further comprises a third port for communicating with a second network that is separate from the private network, and the RMM is further configured to host a Web service that enables a client to access information relating to operation of the RMM via a Web browser using communications sent over the second network.

19. A system comprising:
a rack, including a plurality of pooled system drawers, each pooled system drawer associated with a respective power zone including one or more power sensors and one or more power control devices and a respective thermal zone including one or more thermal sensors and one or more thermal devices;
first and second rack management modules (RMMs), linked in communication via an RMM-to-RMM link, each RMM linked in communication with at least one power sensor and the at least one power control device in each of the respective power zones and linked in communication with at least one thermal sensor and at least one thermal device in each respective thermal zone;

wherein the system is further configured to:
implement one of a first and second RMMs as an initial master RMM and the other RMM as an initial slave RMM;
when an RMM is being implemented as a master RMM, using the RMM to,
monitor the power and thermal zones in the rack by,
receiving power data from one or more power sensors for each power zone;
receiving thermal data from one or more thermal sensors for each thermal zone; and
communicating with at least one of,
one or more power control devices for each of one or more power zones to control power in that power zone; and
one or more thermal devices for each of one or more thermal zones to control operation of the one or more thermal devices;
maintain power and thermal zone state information for each pooled system drawer; and
periodically synchronize power zone and thermal zone state information between the master RMM and the slave RMM; and
detect a fail-over condition for the master RMM, and in response thereto,
implement the initial slave RMM as a new master RMM;
reset the initial master RMM; and
implement the initial master RMM as a new slave RMM.

20. The system of claim 19, wherein the first and second RMMs are further configured to:
periodically send health information from a current master RMM to a current slave RMM over the RMM-to-RMM link;
detect that the current master RMM is failing or has failed; and
in response thereto, initiate a fail-over operation under which the current slave RMM becomes a new master RMM.

21. The system of claim 19, wherein the rack includes a Top of Rack (ToR) switch that is connected to each of the plurality of the pooled system drawers via a plurality of communication links, and wherein the master and slave RMMs perform operations relating to management of the power and thermal zones using a private network that includes communication links that are separate from the communication links between the ToR switch and the plurality of pooled system drawers.

22. The system of claim 19, further comprising:
a rack management switch, linked in communication with each of the first and second RMMs via respective links; and
a respective Pooled System Management Engine (PSME) for each of the plurality of pooled system drawers, each PSME linked in communication with the rack management switch,
wherein each of the first and second RMMs are enabled to communicate with each of the PSMEs via the rack management switch.

23. The system of claim 22, wherein the rack management switch includes a plurality of ports and the system is further configured to:
identify designated ports on the rack management switch to support communication between the first and second RMMs and the plurality of PSMEs, wherein each PSME is communicatively coupled to a respective designated port on the rack management switch via a respective communication link, and each of the first and second RMMs is communicatively coupled to a respective designated port in the rack management switch via a respective communication link.

24. The system of claim 22, wherein the system is further configured to:
authenticate, via a current master RMM, each of the plurality of PSMEs, and generate corresponding PSME authentication information; and
communicate the PSME authentication information to a current slave RMM.

25. The system of claim 22, wherein the first and second RMMs are configured to communicate with the rack management switch and the PSMEs using a private network, wherein at least one RMM further includes a port to connect to a second network that is separate from the private network, and the at least one RMM is further configured to host a Web service that enables a client to access information relating to operation of the RMM via a Web browser using communications sent over the second network.

* * * * *